United States Patent [19]

Komurasaki

[11] Patent Number: 4,530,328

[45] Date of Patent: Jul. 23, 1985

[54] IGNITION TIMING CONTROLLER FOR INTERNAL COMBUSTION ENGINE

[75] Inventor: Satoshi Komurasaki, Himeji, Japan

[73] Assignee: Mitsubishi Denki Kabushiki Kaisha, Japan

[21] Appl. No.: 483,699

[22] Filed: Apr. 11, 1983

[30] Foreign Application Priority Data

Apr. 15, 1982 [JP] Japan ................................ 57-64404
Apr. 15, 1982 [JP] Japan ................................ 57-64405

[51] Int. Cl.³ .............................................. F02P 5/04
[52] U.S. Cl. .................................................. 123/425
[58] Field of Search ....................... 123/423, 425, 435

[56] References Cited

U.S. PATENT DOCUMENTS

| | | | |
|---|---|---|---|
| 4,002,155 | 1/1977 | Harned et al. | 123/425 |
| 4,370,963 | 2/1983 | Iwata et al. | 123/425 |
| 4,377,999 | 3/1983 | Komurasaki et al. | 123/425 |
| 4,388,902 | 6/1983 | Latapie | 123/425 |
| 4,440,129 | 4/1984 | Iwata | 123/425 |

*Primary Examiner*—Parshotam S. Lall
*Assistant Examiner*—W. R. Wolfe
*Attorney, Agent, or Firm*—Leydig, Voit, Osann, Mayer and Holt, Ltd.

[57] ABSTRACT

The present invention relates to an ignition timing controller for an internal combustion engine comprising: an acceleration sensor for detecting the vibration acceleration of the engine, means for sorting knocking signal component by removing the other noise signal components from the output of said acceleration sensor, means for generating a reference ignition timing signal, phase shifting means for varying the phase of said reference ignition timing signal, switching means for interrupting the energization of an ignition coil, and means for variably controlling the maximum value of the phase displacement of the reference ignition timing signal by said phase shifting means.

7 Claims, 21 Drawing Figures

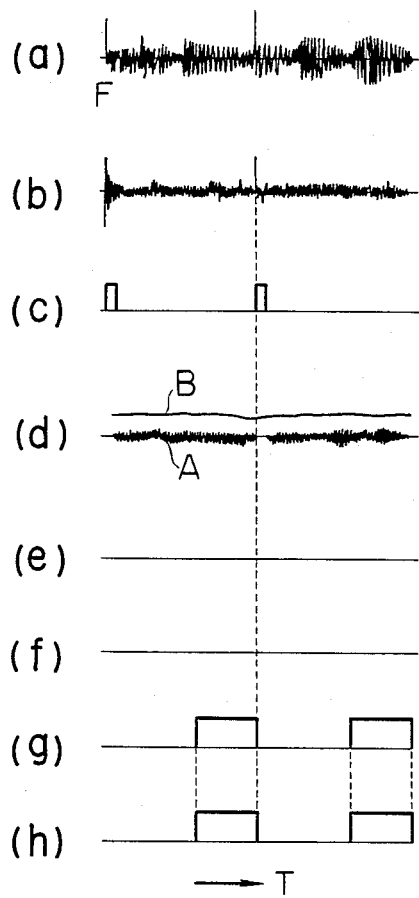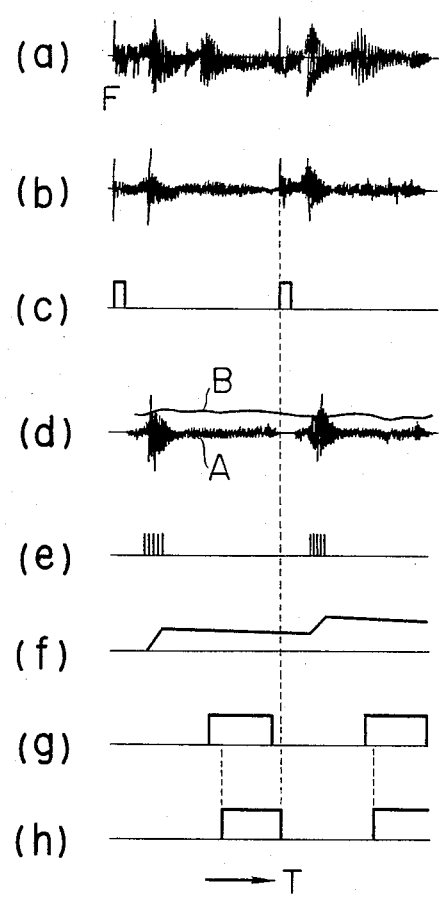

IGNITION TIMING CONTROLLER FOR INTERNAL COMBUSTION ENGINE

BACKGROUND OF THE INVENTION

This invention relates to an ignition timing controller for an internal combustion engine.

The setting of an ignition timing of an internal combustion engine is performed so that the engine can be operated most efficiently. It is generally preferred to set the igniting timing of the engine so as to approach to a MBT (Minimum advance for best torque) as near as possible in a range that the engine does not knock.

However, a prior-art ignition timing controller which is heretofore used mostly employs a mechanical structure, is not accordingly stabilized for the ignition angle leading characteristic in the irregularity of the products and in the ageing change. The actual ignition timing of the engine is set at the side considerably delayed from the above-described desired ignition timing so as to prevent the knocking of the engine, causing a deterioration in the efficiency of the engine. Even if the ignition timing controller which has less irregularity and ageing change is employed, knocking phenomenon of the engine depends upon the suction air temperature, humidity and further air-fuel ratio of the engine. Accordingly, even if the ignition timing is set so as not to cause a knocking under a certain operating conditions of the engine, the knocking might occur under different conditions of the engine.

The ignition timing can be matched to a value which does not cause a knocking by detecting the occurrence of the knocking and controlling the ignition timing delay even if an error occurs in the ignition leading angle due to irregularity in the product and the difference of the operating conditions of the engine. Under such conditions, the knocking frequently occurs at the accelerating time rather than the normally operating time of the engine, and the level of the knocking becomes large. It is necessary to provide a larger controlling angle than the normal time so as to sufficiently suppress the knocking at the transient time.

SUMMARY OF THE INVENTION

The present invention has been made in view of the foregoing circumstances, and provides an ignition timing controller for an internal combustion engine, which can control the ignition timing of the engine in a sufficiently wide angle range by increasing the controlling angle range of the ignition timing due to a knock signal during the acceleration operation time of the engine, and which can effectively remedy at the time of frequent knocking or excessively knocking and can suitably control the ignition timing during the normal operation after the acceleration, thereby enabling the efficient engine operation.

BRIEF DESCRIPTION OF THE DRAWINGS

FIGS. 3, a–h and 4, a–h are waveform diagrams of the operations at the time of causing no knocking and knocking in the engine;

DESCRIPTION OF THE PREFERRED EMBODIMENTS

An embodiment of an ignition timing controller of the present invention will now be described in detail with reference to the accompanying drawings.

Figure 1:
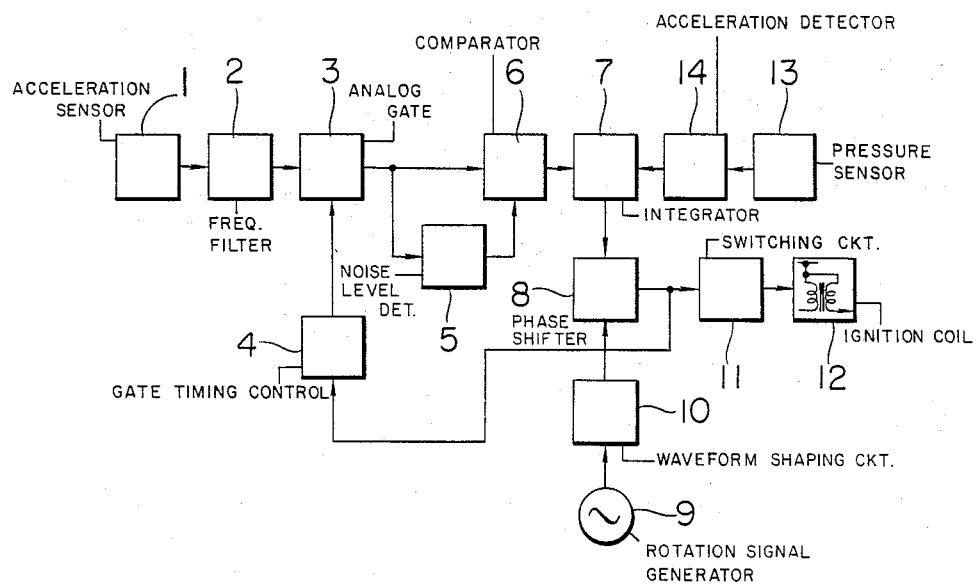
FIG. 1 is a circuit block diagram showing an embodiment of an ignition timing controller according to the present invention.

FIG. 1 is a circuit block diagram of the exemplified controller of this invention. In FIG. 1, numeral 1 designates a vibration sensor which is mounted in an internal combustion engine (not shown) for detecting the vibration of the engine, numeral 2 a frequency filter which produces only a signal component of high frequency sensitivity from the output of the sensor 1 for the knocking of the engine, numeral 3 an analog gate which shuts off noise which is a disturbing wave for the detection of the knocking of the engine from the output signal of the filter 2, numeral 4 a gate timing control unit for instructing the opening or closing of the gate 3, numeral 5 a noise level detector for detecting the level of the mechanical vibration noise of the engine except the noise at the knocking time, and numeral 6 a comparator which compares the output voltage of the gate 3 with that of the detector 5 for generating a knocking detection pulse.

Numeral 7 indicates an integrator which integrates the output pulse of the comparator 6 for generating an integrated voltage corresponding to the knocking strength, numeral 8 a phase shifter which displaces the phase of an ignition signal to become a reference correspondingly to the output of the integrator 7, numeral 9 a rotation signal generator which generates an ignition signal corresponding to the ignition leading angle characteristics set in advance, numeral 10 a waveform shaping circuit which shapes the waveform of the output of the generator 9 and performs the closed angle control of the energization of an ignition coil 12, numeral 11 a switching circuit which interrupts the energization of the coil 12 according to the output signal of the phase shifter 8, numeral 13 a pressure sensor which detects the suction manifold pressure of the engine, and numeral 14 an acceleration detector which detects the accelerated state of the engine from the output variation of the sensor 13.

Figure 2:
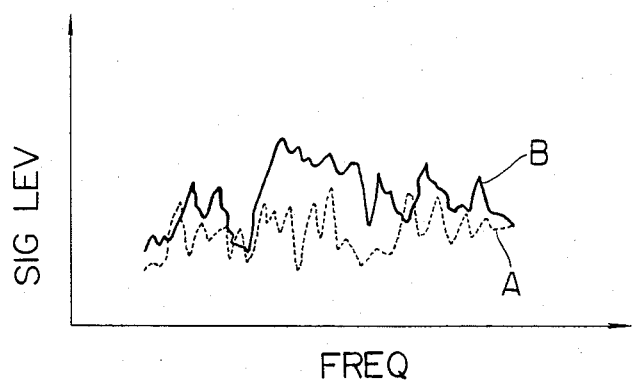
FIG. 2 is an output characteristic curve diagram of an acceleration sensor of the controller.

FIG. 2 shows the frequency characteristic of the output signal of the sensor 1, wherein a curve A indicates the case that no knocking occurs in the engine, and a curve B indicates the case that a knocking occurs in the engine.

The output signal of the sensor 1 contains a knock signal generated upon knocking of the engine, mechanical noise of the engine, and a variety of noise components carried on the other signal transmission lines such as, for example, an ignition noise. When the curve A is compared with the curve B, it is understood that the knock signal has specific frequency characteristic distribution. This distributions have slight difference depending upon the sort and type of the internal combustion engine and the position of mounting the sensor, but respectively have clear differences due to the presence or absence of the knocking. Accordingly, the knock signal can be efficiently detected by producing only the specific frequency component of the knock signal by suppressing the noise of other frequency components.

Further, FIGS. 3 and 4 show the waveforms of the operations of the respective sections of the ignition timing controllers of the embodiment in FIG. 1, wherein FIG. 3 shows the modes in which no knocking occurs in the engine, and FIG. 4 shows the modes in which knocking occurs in the engine.

The operation of the ignition timing controller of the invention will now be described.

The rotation signal which is generated from the generator 9 in response to the ignition timing characteristic set in advance is shaped by the circuit 10 into a waveform comprising an opening and closing pulse having a desired closing angle, which drives the circuit 11 through the shifter 8, thereby interrupting the energization of the coil 12. Thus, the ignition of the engine is controlled by the ignition voltage which is generated at the secondary coil side at the time of interrupting the energization, thereby operating the engine, and the vibration of the engine produced during the operation of the engine is detected by the sensor 1.

When no knocking occurs in the internal combustion engine, the vibration of the engine which is caused by the knocking does not occur, while a mechanical noise or an ignition nose carried on the signal transmission line at the ignition timing F is generated, as shown in FIG. 3(a) as the output signal of the sensor 1 by the other mechanical vibrations. This output signal from the sensor 1 is considerably suppressed, as shown, by passing FIG. 3(b) in the mechanical noise components through the filter 2, but since the ignition noise component is strong, the ignition noise is outputted at a large level even after it is passed through the filter 2.

Since the ignition noise may thus be erroneously recognized as a knock signal, the gate 3 is closed by the output shown in FIG. 3(c) from the control unit 4 to be triggered by the output of the shifter 8 only during the predetermined period from the ignition timing F, thereby interrupting the ignition noise. In this manner, only the mechanical noise of low level shown by A in FIG. 3(d) is retained at the output of the gate 3. The output characteristics of detector 5 are capable of responding to the change of the peak value of the output of the gate 3 and, in this case, to the relatively slow change due to the peak value of the ordinary mechanical noise that is provided at the detector 5, a DC voltage which is slightly higher than the peak value of the mechanical noise is generated as designated by B in FIG. 3(d). Thus, since the output of the detector 5 is larger than the mean peak value of the output signal of the gate 3, no output is produced from the comparator 6 for comparing them as shown in FIG. 3(e), resulting in the removal of all noises.

Accordingly, no output voltage exists even in the integrator 7 as shown in FIG. 3(f), the phase shift angle (phase difference between the input and the output) of the shifter 8 is also zero, the opening or closing phase of the circuit 11 which is driven and controlled by the output of the shifter 8 and hence the interrupting phase of energizing the coil 12 becomes in phase with the reference ignition signal as the output signal shown in FIG. 3(g). Thus, the ignition timing position becomes the same as the reference ignition position as shown in FIG. 3(h).

When a knocking then occurs in the engine, a knock signal is contained in the vicinity of time delay from the ignition timing as shown in FIG. 4(a) at the output of the sensor 1. Upon vibration of the engine due to the knocking, the output from the filter 2 becomes as shown in FIG. 4(b). Thus, the signal which passes through the gate 3 is superposed with a large knock signal with the mechanical noise as shown by using A in FIG. 4(d) by the output from the control unit 4 which is shown in FIG. 4 (e). Since the rise of the knock signal is abrupt at the signal after passing through the gate, the output voltage level of the detector 5 has a response delay to the knock signal. Then the input to the comparator 6 becomes as shown by A and B in FIG. (d), the pulse responsive to the knock signal is generated at the output as shown in FIG. (e), and the integrated voltage is generated from the integrator 7 for integrating the output of the comparator 6 as shown in FIG. 4(f).

In response to the output voltage of the integrator 7, the shifter 8 shifts the output signal of the circuit 10 at the timing delay side. The output phase of the shifter 8 is delayed from the phase of the reference ignition signal (in FIG. 4(g)) of the circuit 10. The circuit 11 is driven and controlled by the phase delayed output, thereby delaying the ignition timing by the ignition coil 12 and suppressing the knocking.

The states of the FIG. 3 or 4 is repeated in this manner, and the optimum ignition timing control can be performed.

The knocking in the internal combustion engine frequently occurs at the time of acceleration operation of the engine as compared with the time of ordinary operation of the engine, and it is known that the level of knocking is large. Since, if the maximum controlling angle during the ordinary and acceleration operations, and hence when the phase shifting angles at the shifter 8 are the same, the controlling angle becomes insufficient during the accelerating time, thereby unable to sufficiently suppress the knocking, resulting in remarkable disabled operation for the engine particularly for the purpose of high power.

In order to remedy against this trend, in the exemplified embodiment, the sensor 13 for detecting the suction pressure is provided at the suction manifold of the engine, the acceleration detector 14 for detecting the accelerating state of the engine by the variation in the level of the pressure signal from the sensor 13 is provided, the acceleration operation representing signal from the detector 14 is inputted to the integrator 7, and the phase shifting angle control at the time of accelerating the engine to the shifter 8 is set sufficiently larger than at the normal operating time.

Figure 5:
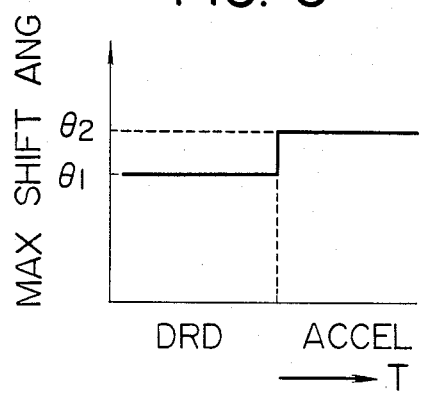
FIG. 5 is a characteristic curve diagram of the maximum phase shift angle of the controller.

This operation will be more specifically described. When the differentiated value of the pressure signal from the sensor 13 is calculated by the detector 14 and the calculated value is judged as being the accelerating time signal in the case it is higher than a predetermined value, the acceleration signal is inputted to the integrator 7, which in turn operates to change the maximum value of the integrated voltage for a value larger than the value at normal operation time. Since the shifter 8 shifts the output signal from the circuit 10 corresponding to the output voltage of the integrator 7, when the output voltage of the integrator 7 becomes a value larger than the normal value, the output signal of the circuit 10 is outputted as the signal in phase at an angle larger than the shift in phase at normal operation time. In other words, the maximum phase shift angle or phase displacement $\theta_1$ at the normal operation time becomes $\theta_2$ by the above-described operation, as shown in FIG. 5, (where $\theta_1 < \theta_2$). The result is that the phase shifting angle control can be performed in the sufficiently large and wide range at the accelerating time as compared with the ordinary operation time.

On the other hand, when the phase shifting angle range is thus widened at the accelerating time, the operating efficiency of the engine at the ignition timing of the ordinary operation time, after the phase shifting angle of the ignition timing is increased, becomes a problem.

More specifically, when the maximum phase shift angle at the accelerating time is, for example, at an angle $\theta_2$ shown in FIG. 5, this angle $\theta_2$ is larger than the maximum shift angle $\theta_1$ necessary at the ordinary operation time, then the state is excessively shifted by an angle $(\theta_2-\theta_1)$ at the ordinary operation time after the acceleration, and the reset of this excessive shift normally necessitates a period longer than 10 seconds. The result is that the operating efficiency of the engine might decrease during this resetting period. Therefore, it is desired to reset the shifting angle rapidly to the $\theta_1$ when the shifting angle at the accelerating time is larger than the $\theta_1$.

Figure 6:
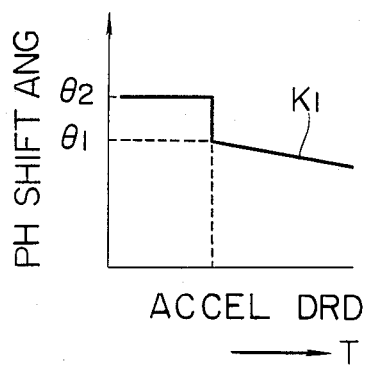
FIGS. 6 and 7 are characteristic curve diagrams of the returning speed at the ignition timing.

In the embodiment exemplified to satisfy this requirement, the shifting angle is instantaneously reset to $\theta_1$ after the accelerated state is finished as shown in FIG. 6, and the shifting angle is then gradually reduced by the normal resetting speed $K_1$ of the integrator 7. Thus, the integrator output voltage of the integrated 7 is reduced when the operating state of the engine as detected by the detector 14 returns to normal operation at constant speed, and the shifting angle of the shifer 8 is set to the value $\theta_1$.

In this case, when the shifting angle is instantaneously reduced to $\theta_1$ as shown in FIG. 6 according to the setting of the detection of engine or the accelerating state by the detector 14, the ignition timing is excessively reduced, thereby causing again the knocking or deteriorating the feeling at the engine. Therefore, in this case, the resetting speed is set to $K_2$ until the shifting angle becomes $\theta_1$ from $\theta_2$, as shown in FIG. 7, and may be set to normal resetting speed $K_1$ when the change in angle becomes less than $\theta_1$.

Figure 7:
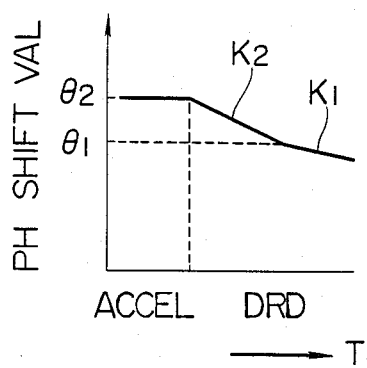

In FIG. 7, the shifting angle is continuously linearly set from $\theta_2$ to $\theta_1$, but the angle may be stopped between $O_2$ and $\theta_1$, or this resetting speed may be variably set according to the engine rotating speed, coolant temperature or lubricating oil temperature. Further, in FIGS. 6 and 7, the resetting time of an ignition timing is accelerated at an angle larger than the ordinary maximum shift angle, and may be set to a value higher than a predetermined value less than the ordinary maximum shift angle to match the engine.

According to the present invention as described above, the knock signal of special frequency is sorted from the outputs of the sensor for detecting the vibration of the internal combustion engine and the ignition timing is delayed in response to the level, thereby suppressing the knocking. The shift angle of the ignition timing at the accelerating time of the engine is larger than the shift angle of ignition timing at the ordinary operation time, thereby sufficiently suppressing the knocks frequently occurring at the accelerating time. The shifting angle is rapidly reset to the predetermined ordinary operation time value at the ordinary operation time after the acceleration, when the shift angle at the accelerating time becomes is higher than the predetermined value at the ordinary operation time, thereby improving the operating efficiency of the engine even after the acceleration of the engine.

What is claimed is:

1. An ignition timing controller for an internal combustion enging having an ignition coil comprising:
    an acceleration detector for detecting the acceleration of the engine from normal operation and producing an acceleration operation representing signal including a sensor for detecting the vibration of the engine;
    means for deriving a knocking signal component by removing a noise signal component from the output of said vibration sensor;
    means for generating a reference ignition timing signal;
    phase shifting means actuated responsive to the knocking signal for varying the phase of said reference ignition timing signal;
    means responsive to said acceleration operation representing signal for variably adjusting the maximum value of the displacement of phase of the reference ignition timing signal by said phase shifting means during any change between normal operation and acceleration operation; and
    means for energizing said ignition coil including switching means for interrupting the energization of said ignition coil according to the phase of said timing signal.

2. An ignition timing controller for an internal combustion engine according to claim 1, wherein the maximum phase displacement by said phase shifting means in increased at the accelerating time larger than at the ordinary operation time.

3. An ignition timing controller for an internal combustion engine according to claim 2, said controller including a pressure sensor for detecting suction pressure of the engine, and means for determining acceleration operation of the engine based on the magnitude of the differentiated value of a signal from said pressure sensor.

4. An ignition timing controller for an internal combustion engine according to claim 2 wherein the maximum value of the displacement of phase of the reference ignition timing signal is adjusted instantaneously during any change in either direction between normal operation and acceleration operation.

5. An ignition timing controller for an internal combustion engine according to claim 2 wherein said signal is adjusted gradually during any change from acceleration operation to normal operation.

6. An ignition timing controller for an internal combustion engine according to claim 2 wherein said signal is adjusted gradually during ay change from acceleration to normal operation and adjusted instantaneously during any change from normal operation to acceleration operation.

7. An ignition timing controller for an internal combustion engine according to claim 2 wherein the actual value of the phase of the timing signal is greater than the maximum value during normal operation and less than the maximum value during acceleration operation determined by said variable adjusting means.

* * * * *